United States Patent [19]

Todoroki et al.

[11] 3,940,964
[45] Mar. 2, 1976

[54] METHOD FOR MAKING A CLAD WIRE FOR AN ELECTRIC CONTACT

[75] Inventors: Tsunehiko Todoroki, Yamatokoriyama; Sankichi Shida, Kawanishi, both of Japan

[73] Assignee: Matsushita Electric Industrial Co., Ltd., Osaka, Japan

[22] Filed: Oct. 1, 1974

[21] Appl. No.: 511,466

[52] U.S. Cl. .................... 72/177; 72/278; 72/377; 29/630 R; 29/DIG. 11; 72/DIG. 10
[51] Int. Cl.² .................................. B21C 1/00
[58] Field of Search ............ 72/274, 278, 282, 231, 72/281, 467, DIG. 700, 177; 29/527.2, 527.5, 480, 624, 630 R, DIG. 11, 630 C, 630 D

[56] References Cited
UNITED STATES PATENTS

| | | | |
|---|---|---|---|
| 1,384,448 | 7/1921 | Gilbert et al. | 72/278 |
| 3,266,281 | 8/1966 | Fust | 72/231 X |
| 3,327,370 | 6/1967 | Cohen | 29/527.2 X |
| 3,433,043 | 3/1969 | Vermeulen et al. | 72/467 X |
| 3,503,120 | 3/1970 | Pierce | 29/527.2 |
| 3,811,311 | 5/1974 | Barone et al. | 72/700 |
| 3,890,700 | 6/1975 | Diepers et al. | 29/DIG. 11 |

Primary Examiner—Milton S. Mehr
Attorney, Agent, or Firm—Wenderoth, Lind & Ponack

[57] ABSTRACT

A clad wire for an electric contact is made by sofening a clad tape, which consists of at least a base metal and a surface layer of noble metal, by annealing, forming the softened clad tape into a cross sectional form of a circular arc, and cold-drawing the formed clad tape through a die having a desired cross sectional shape so as to provide a clad wire.

8 Claims, 11 Drawing Figures

METHOD FOR MAKING A CLAD WIRE FOR AN ELECTRIC CONTACT

This invention relates to a method for making a clad wire suitable for use as an electric contact, and more particularly to a method for making a clad wire which is made of clad tape comprising a noble metal as a surface layer.

Electric contact parts can be often made economically from clad materials consisting of a base metal and a surface layer of noble metal firmly bonded to the base metal. The form which is most commonly used is a narrow sheet or a tape for ease of fabrication. Although this form of a wire is serviceable, such wire is not used usually because of difficulty of-fabrication and of getting a partially clad wire.

Clad wires are usually made by an electro-deposition method or a piping method. The electrodeposition method comprises the steps of electrodepositing a noble metal on a core wire of base metal and drawing the electrodeposited core wire. This method has a defect that it is difficult to provide a thick layer of noble metal which gives higher resistance against chemical corrosion such as sulfurization. The piping method comprises the steps of inserting a base metal rod into a noble metal pipe, heating the rod and the pipe to a high temperature and drawing the wire. In this method, because the length and thickness of the pipe are limited, it is difficult to get a clad wire having a long length and a thin noble metal coating layer. Furthermore, hollowing a noble metal rod to form a pipe causes a loss of materials. Besides, both the methods need a well-equipped arrangement to make clad wire in a practical way, and moreover it is difficult to provide a clad wire with three or more surface or coating layers.

Therefore, an object of the present invention is to provide a novel method for making a clad wire, which overcomes the problems of the conventional methods.

Another object of this invention is to provide a novel and improved method for making a clad wire, which is made from a clad tape, at a low cost.

A further object of this invention is to provide a method for making a clad wire in which the surface layers are bonded firmly to each other and thickness of each layer is variable.

These objects are achieved by a method for making a clad wire for electric contacts according to the present invention which comprises broadly the following two steps:
1. the step of softening a clad tape, which consists of a base metal and a surface layer of noble metal, by annealing and forming the clad tape into the cross sectional shape of a circular arc perpendicular to longitudinal direction of the tape with the noble metal surface layer on the outside thereof; and
2. the second of cold-drawing the formed clad tape through a die with a standard section so as to provide a clad wire is partially clad with noble metal as a surface layer, and intermediate annealing if necessary.

The method according to this invention as described briefly above has the following features:
1. Because the noble metal layer is stretched in the transverse direction during forming in the first step, the succeeding cold-drawing process provides a clad wire having the noble metal layer stretched around the wire laterally more than the half of the periphery of the clad wire. If the forming process of the first step is not carried out, the noble metal layer of the resultant clad strip is compressed in the direction of its width during the cold-drawing process and the layer becomes narrower on the clad wire. The clad wire having such a narrow noble metal layer has poor electric contact characteristics.
2. Because the clad sheet or tape is commonly made easily and cheaply compared to the conventional method of making the clad wire described hereinbefore, the clad wire according to this invention can be made easily and cheaply.
3. Failures of the bonding of the sheets to each other so as to make a clad sheet are less than in bonding the rod and pipe so as to make a clad wire, and so the bonding of each layer of the clad wire to the other layers provided by the method according to this invention is firm and rigid.
4. Two or more layers can be easily provided on the clad wire because a clad strip with multiple surface layers can easily be made compared to the conventional electrodeposition method or the piping method.
5. Because the thickness ratio of the surface layer of the clad tape can be controlled over a wide range during bonding to the original sheets, the thickness ratio of the surface layers of the clad wire can be varied widely.

These and other objects of this invention will be apparent upon consideration of the following detailed description taken together with accompanying drawings wherein.

Now, referring to FIGS. 1a–1d, the method of making the clad wire according to the present invention will described in the following.

FIGS. 1a–1d show the change of the cross-section; of the clad material at each step during the fabrication. The starting material is a clad tape 10 which consists of a surface layer 11 of noble metal, an intermediate layer 12 and a base metal layer 13. This original clad tape 10 is provided by slitting a wide clad sheet (not shown in FIG. 1) made by a conventional fabrication process.

Figure 1A:
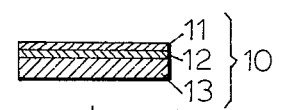
FIGS. 1a–1d are schematic cross-sectional views of the steps of one embodiment of the method according to the present invention.
Figure 1B:
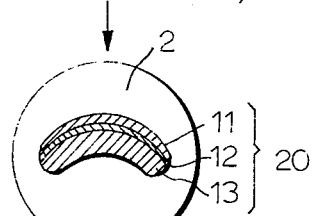

The clad tape 10 is annealed at a tempertaure above the recrystallization temperature of the constituent elements in a nonoxidizing atomosphere. After being annealed for a given time which depends upon the size of the clad tape, the clad tape 10 is cold-drawn through a forming die 2 so as to provide a formed clad tape 20 with the noble metal layer 11 on the outside peripheral surface thereof, as shown in FIG. 1b. The shape of the cross-section of the forming die 2 is that of a circular arc with a thickness equal to the thickness of the clad tape and with a circular arc length equal to the width of the clad tape. Thus, the flat clad tape 10 is formed by bending into the formed clad tape 20 which has a transverse cross sectional shape of a circular arc.

After being formed, the formed clad tape 20 is cold-drawn through a die 3 having a semi-circular section, and the bend of the formed clad tape 20 is increased.

Figure 1C:
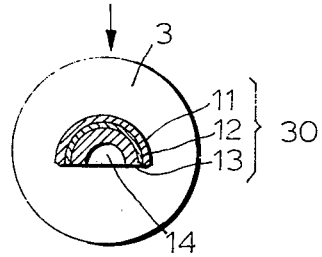
Figure 1D:
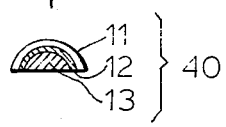

Then, there is provided a further formed clap tape 30 bent transversely to form a longitudinal groove 14 surrounded by the base metal 13, as shown in FIG. 1c. With successive drawings through dies having smaller semi-round sections, the area of the further formed clad tape 30 is reduced step by step and the size of the groove 14 is reduced. Then after the last straw there is provided a clad wire 40 according to the invention, as shown in (d).

Figure 2A:
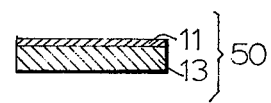
FIGS. 2a–2e are similar views of another embodiment of the method for making the clad wire according to the present invention.
Figure 2B:
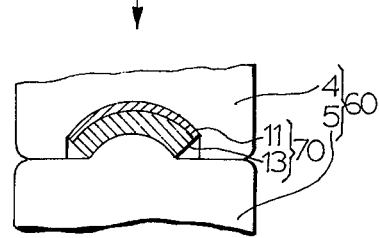
Figure 2C:
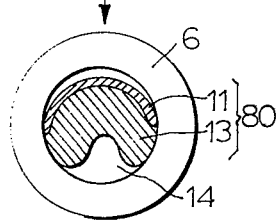
Figure 2D:
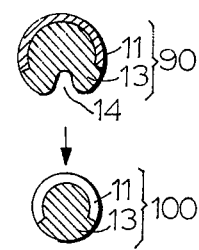
Figure 2E:
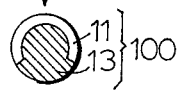

FIGS. 2a–2c another embodiment of the present invention. The method shown in FIG. 2 for making a clad wire is substantially the same as the method described in connection with the parts of FIG. 1, except that the initial clap strip 50 is in two layers, the noble metal surface layer 11 and the base metal layer 13, forming is carried out by a forming roll pair 60 which comprises a concave profile roller 5 and a convex profile roller 4 opposite to the concave profile roller 5, and that the cross-section of the die 6 for normal cold-drawing is perfectly round.

With regard to the constitutions of the clad tape, and accordingly the clad wire, the operable noble metals for the surface layer 11 include silver, silver alloys, gold, gold alloys, palladium, palladium alloys, platinum and platinum alloys for obtaining good electric contact characteristics. The operable materials to be used for the intermediate layer 12 include silver, silver alloys, nickel and nickel alloys for obtaining good conductive characteristics or diffusion barrier characteristics. The operable materials for the base metal layer 13 include copper, copper alloy, nickel and nickel alloy for obtaining good mechanical properties.

In order to get sufficent width of the noble metal surface layer of the clad wire, it is preferable to arrange the ratio of the thickness to the width of the clad tape so as to range from 1/3 to 1/5. A thick clad tape having such a ratio higher than 1/3 is undesirable because of the difficulty of forming the clad tape in the first step. A wide clad tape having such a ratio smaller than 1/5 is also undesirable because it will produce a deep groove 14 and cause degradation of the mechanical properties of the clad wire.

In order to bend the clad tape sufficiently during the step of forming, it is preferable to divide the forming step into two or three processes so as to increase the bend of the clad tape gradually and finally to the desired cross-sectional shape before normal drawing.

Annealing for softening the clad tape is performed in an nonoxidizing atmosphere as the occasion may demand such as nitrogen gas, argon gas or vacuum so as to prevent oxidization of the material.

Reduction of the cross-sectional area of the clad material in normal cold-drawing varies from 15% to 30% per pass. Various lubricants such as mineral oil, fatty oil or soap are applied to the die so as to reduce the power required for drawing and for improving the surface finish of the clad material as well as for increasing the life of the die. The speed of drawing the clad tape varies from 5 to 50 m/min and it is determined by the cross-sectional area of the clad material and by the temperature developed during drawing which affects the properties of the lubricant, the structure of the metal being drawn and the life of the die.

Although the cross sections of the finished clad wire shown in FIGS. 1 and 2 are semiround and completely round, respectively, other shapes of the cross section of the clad wire, such as triangles, squares, trapezoids and other special shapes, may be utilized by employing dies having a such a cross-sectional shape.

Tables 1a and 1b give shows examples of fabrication conditions and some properties of the resultant various clad wires according to this invention, in which the symbols used have the following meanings:

D: degree of reduction of the area after final annealing,
$\phi$: diameter
R: radius,
$\sigma$: ultimate strength in tension,
$\delta$: elongation
Hv: Vickers hardness of the surface layer at a measuring load of 25g. (This hardness is effected by hardness of the under layer when the thickness of the top layer becomes thin.)

Figure 3:
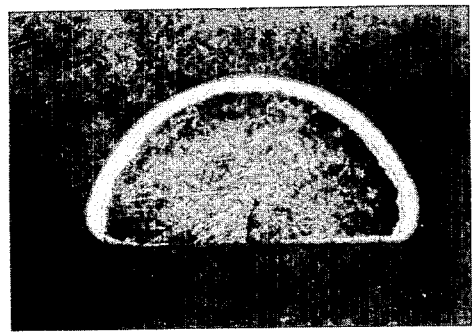
FIGS. 3 and 4 are cross sectional photographs of the clad wire made by the method of the invention.
Figure 4:
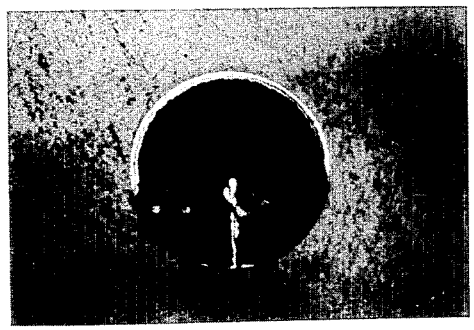

FIGS. 3 and 4 are photographs of the cross section of the clad wires which are made by the methods of FIGS. 1 and 2, respectively. It is easily understood that there are provided clad wires of semi-round and round cross section which have a thin surface layer of a noble metal, as shown in the white color in those photographs, respectively.

Table 1-(a)

| Example | Width (mm) | thickness (mm) | surface layer (wt%) | metal of each layer intermediate layer (wt%) | base layer (wt%) |
|---|---|---|---|---|---|
| 1 | 2.8 | 0.6 | Ag | — | phosphor bronze |
| 2 | 2.8 | 0.6 | Au | 66Ni-34Cu | phosphor bronze |
| 3 | 2.5 | 0.5 | Pt | — | Ni |
| 4 | 7 | 2 | 60Ag-40Pd | Ni | phosphrous bronze |
| 5 | 4.5 | 1 | 30Ag-40Pd-30Cu | Ni | copper-beryllium |
| 6 | 4.5 | 1 | 30Ag-40Pd-30Cu | Ni | phosphrous bronze |
| 7 | 7 | 2 | 70Au-27Ag-3Ni | Ni | phosphrous bronze |
| 8 | 2.8 | 0.6 | 70Au-27Ag-3Ni | 95Ag-5Cu | phosphrous bronze |
| 9 | 7 | 2 | 85Pd-12Ag-3Ni | 85Ag-13Cu-2Ni | 66Ni-34Cu |

Table 1-(b)

| | condition of fabrication | | | | finished clad wire | | | | |
|---|---|---|---|---|---|---|---|---|---|
| Example | Forming | Annealing temperature (°C) | D (%) | Shape of cross-section | size of cross-section (mm) | thickness ($\mu$) top layer | intermediate layer | $\sigma$ (kg/mm$^2$) | $\delta$ (%) | Hv |
| 1 | die | 500 | 70 | round | =0.7 | 10 | — | 102 | <5 | 120 |
| 2 | die | 650 | 60 | semi-round | R=0.3 | 3 | 12 | 98 | <5 | 240 |
| 3 | die | 650 | 20 | triangle | a side 0.3 | 2 | — | 75 | 28 | 130 |
| 4 | roll | 650 | 55 | semi-round | R=0.5 | 4 | 7.5 | 92 | <5 | 241 |

Table 1-(b)-continued

| | condition of fabrication | | | | finished clad wire | | | | | |
|---|---|---|---|---|---|---|---|---|---|---|
| | | | | | | thickness (μ) | | | | |
| Example | Forming | Annealing temperature (°C) | D (%) | Shape of cross-section | size of cross-section (mm) | top layer | intermediate layer | $\sigma$ (kg/mm²) | $\delta$ (%) | Hv |
| 5 | die | 700 | 40 | semi-round | R=0.3 | 10 | 10 | 110 | <5 | 390 |
| 6 | die | (aging 350°C) | 40 | semi-round | R=0.5 | 20 | 5 | 60 | 8 | 390 |
| 7 | roll | 650 | 55 | tropezoid | tope side 0.5 height 0.5 | 4 | 7.5 | 92 | <5 | 225 |
| 8 | die | 500 | 70 | semi-round | R=0.3 | 4 | 38 | 98 | <5 | 160 |
| 9 | roll | 650 | 55 | semi-round | R=0.5 | 3 | 12 | 82 | <5 | 170 |

We claim:

1. A method for making a clad wire for an electric contact comprising the steps of softening a clad tape by annealing, said clad tape comprising a base metal and at least one surface layer of noble metal firmly bonded to said base metal, forming said softened clad tape into a cross sectional shape of a circular arc perpendicular to the longitudinal direction of said clad tape with said noble metal surface layer on the outside peripheral surface thereof, and normally cold-drawing said formed clad tape through a wire forming die having a standard section with the noble metal surface layer on the outer surface of the drawn clad tape, whereby there is provided a clad wire which is partially clad with said noble metal as a surface layer.

2. A method for making a clad wire for an electric contact as claimed in claim 1, wherein said clad tape has a ratio of thickness to width ranging from ⅓ to 1/5.

3. A method for making a clad wire for an electric contact as claimed in claim 1, wherein said clad tape is formed into said formed clad tape by being drawn through a forming die having the cross section of the circular arc.

4. A method for making a clad wire for an electric contact as claimed in claim 1, wherein said clad tape is formed into said formed clad tape by being rolled through a forming roll pair comprising a concave profile roller and a convex profile roller opposite to said concave profile roller.

5. A method for making a clad wire for an electric contact as claimed in claim 1, wherein said formed clad wire is drawn through a wire forming die having a cross section shape taken from the group of round, semi-round, triangle, square and trapezoidal.

6. A method of making a clad wire for an electric contact as claimed in claim 1, wherein said noble metal surface layer of said clad wire is stretched around more than a half of the periphery of the cross section of said clad wire.

7. A method for making a clad wire for an electric contact as claimed in claim 1, wherein said clad wire is in two layers of a surface layer and a base metal layer, the material of said surface layer being selected from the group consisting of silver, silver alloys, gold, gold alloys, palladium alloys, platinum or platinum alloys, and the material of said base metal layer being selected from the group consisting of copper, copper alloys, nickel and nickel alloys.

8. A method for making a clad wire for an electric contact as claimed in claim 1, wherein said clad wire has two surface layers, a top surface layer and an intermediate surface layer, and a base metal layer, the material of said top surface layer being a metal selected from the group consisting of silver, silver alloys, gold, gold alloys, palladium, palladium alloys, platinum and platinum alloys, the material of said intermediate surface layer being a metal selected from the group consisting of silver, silver alloys, nickel and nickel alloys, and the material of said base metal layer being a metal selected from the group consisting of copper, copper alloys, nickel and nickel alloys.

* * * * *